(12) United States Patent
Schuurmans et al.

(10) Patent No.: US 7,137,715 B2
(45) Date of Patent: Nov. 21, 2006

(54) EXTERNAL VEHICLE MIRROR HAVING A SELF-LOADING PIVOT AND AN END STOP

(75) Inventors: Maarten J. Schuurmans, Kingswood (AU); Michael Holbrook, Adelaide (AU)

(73) Assignee: Schefenacker Vision Systems Australia Pty Ltd., Lonsdale (AU)

( * ) Notice: Subject to any disclaimer, the term of this patent is extended or adjusted under 35 U.S.C. 154(b) by 52 days.

(21) Appl. No.: 10/473,270

(22) PCT Filed: Mar. 26, 2002

(86) PCT No.: PCT/AU02/00353

§ 371 (c)(1),
(2), (4) Date: Sep. 26, 2003

(87) PCT Pub. No.: WO02/076790

PCT Pub. Date: Oct. 3, 2002

(65) Prior Publication Data

US 2004/0113038 A1    Jun. 17, 2004

(30) Foreign Application Priority Data

Mar. 26, 2001   (AU) .................................... PR3954
Oct. 17, 2001   (AU) .................................... PR8300
Dec. 6, 2001    (AU) .................................... PR9315

(51) Int. Cl.
G02B 5/08       (2006.01)
A47G 1/24       (2006.01)

(52) U.S. Cl. ........................ 359/841; 248/479; 359/871

(58) Field of Classification Search ................ 248/479, 248/476, 477, 478; 403/92–97, 350, 409.1; 359/879, 871, 841, 877
See application file for complete search history.

(56) References Cited

U.S. PATENT DOCUMENTS 4,186,905 A * 2/1980 Brudy ......................... 248/478
4,789,232 A * 12/1988 Urbanek ....................... 248/549

(Continued)

FOREIGN PATENT DOCUMENTS

EP          519117 A     12/1992

(Continued)

*Primary Examiner*—Anita M. King
(74) *Attorney, Agent, or Firm*—Warn, Hoffmann, Miller & LaLone, P.C.

(57) ABSTRACT

A pivot assembly for a vehicle external mirror having a mirror head mounted to a mirror base, the assembly comprising a first member (20), a second member (30), the first and second members (20, 30) mounted in or being part of the mirror base and the mirror head respectively, the first and second members (20, 30) having respectively first and second detent sides (24, 34), inner sides (26, 36) and apertures (28, 38) extending from the detent side (24, 34) to the inner sides (26, 36) respectively, detent means (56, 59), a spigot (50), a spring (60), means (56, 72) for applying a pre-load to the spring (60), the initial relative rotation between the second member (30) and the first member (20) in a first direction causes loading of the spring (60), the pre-load is maintained during subsequent relative rotations between the second (30) and the first member (20).

12 Claims, 16 Drawing Sheets

U.S. PATENT DOCUMENTS

| | | | |
|---|---|---|---|
| 5,432,640 A * | 7/1995 | Gilbert et al. | 359/841 |
| 5,477,392 A * | 12/1995 | Mochizuki et al. | 359/841 |
| 5,557,476 A * | 9/1996 | Oishi | 359/841 |
| 5,639,054 A * | 6/1997 | Gerndt et al. | 248/478 |
| 5,678,945 A * | 10/1997 | Fimeri | 403/92 |
| 5,734,517 A * | 3/1998 | Kang | 359/877 |
| 6,092,778 A * | 7/2000 | Lang et al. | 248/478 |
| 6,183,098 B1 * | 2/2001 | Martin | 359/871 |
| 6,286,968 B1 * | 9/2001 | Sailer et al. | 359/872 |
| 6,322,221 B1 * | 11/2001 | van de Loo | 359/841 |
| 6,390,630 B1 * | 5/2002 | Ochs | 359/841 |
| 6,641,271 B1 * | 11/2003 | Churchett | 359/841 |
| 6,742,756 B1 * | 6/2004 | Fimeri et al. | 248/479 |
| 2002/0001148 A1 | 1/2002 | Fuchs et al. | |

FOREIGN PATENT DOCUMENTS

EP  881124 A  12/1998

* cited by examiner

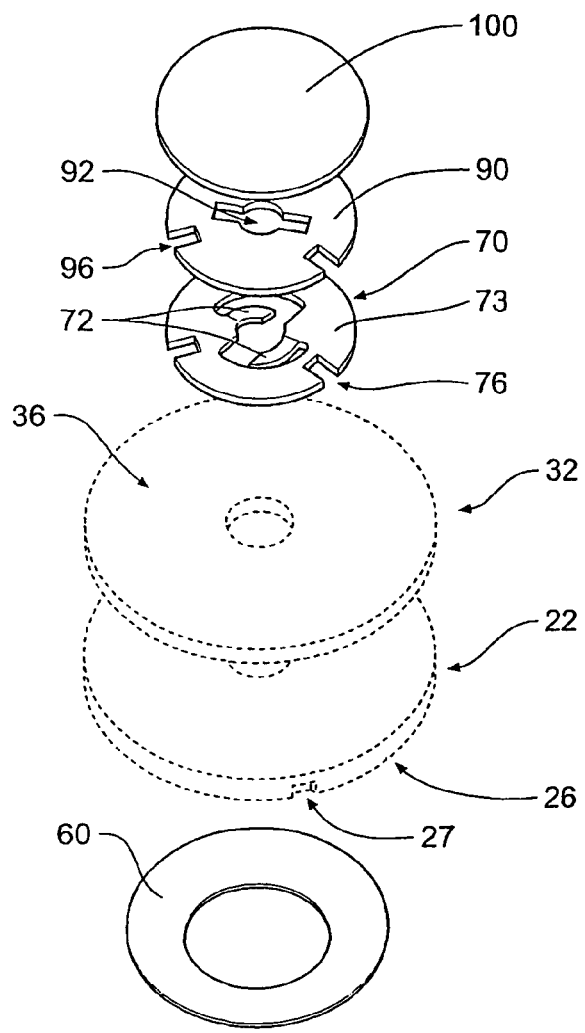
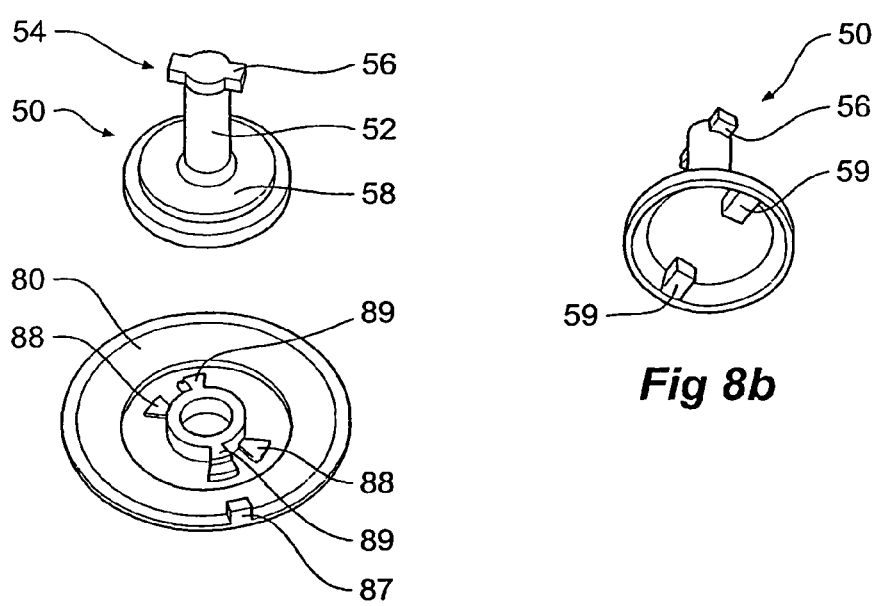
Fig 8a
Fig 8b

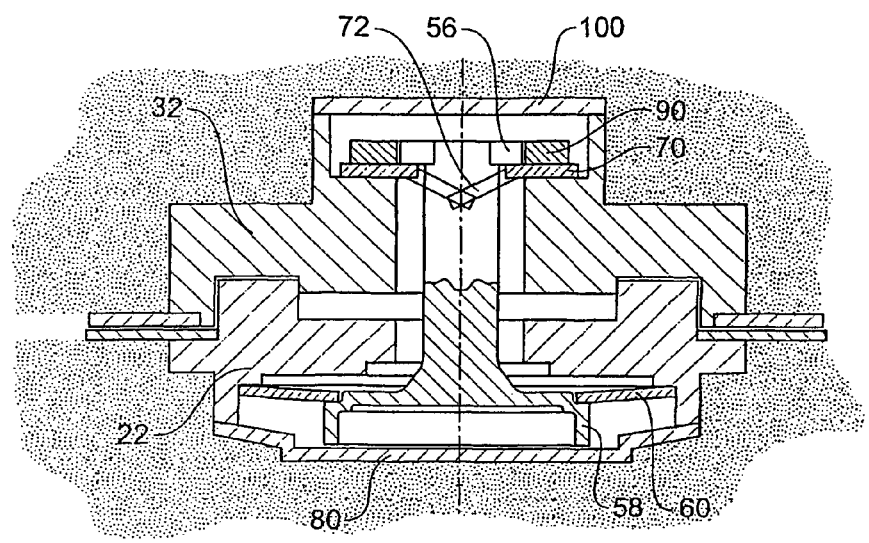
*Fig 11a*
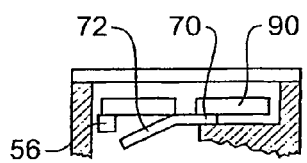 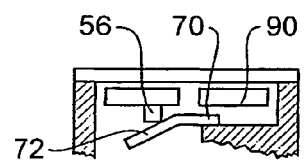 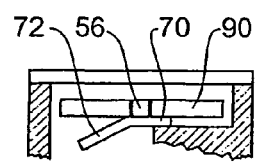
*Fig 11b*          *Fig 11d*          *Fig 11f*
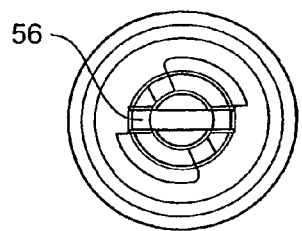 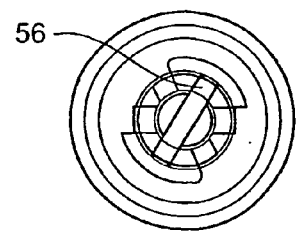 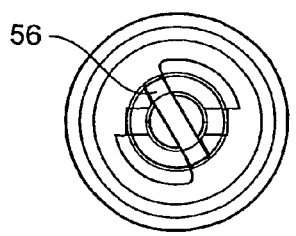
*Fig 11c*          *Fig 11e*          *Fig 11g*

EXTERNAL VEHICLE MIRROR HAVING A SELF-LOADING PIVOT AND AN END STOP

BACKGROUND

The present invention relates to external rear view mirrors for vehicles and in particular to mirrors of the type having a head pivotally mounted to a base.

Vehicle external side rear view mirrors commonly comprise a mirror head which is pivotally attached to a mirror base or mounting bracket. The mounting bracket is in turn secured to the motor vehicle body. The pivot enables the mirror head to rotate with respect to the base if it is impacted either while the vehicle is moving or stationery (referred to as "mirror break away"). The pivot also enables the mirror head to move to a "park" position under the action of a drive means to effectively reduce the width of the vehicle and reduce the risk of impact or interference from passing pedestrians or other vehicles. The ability to "park" the mirror head also facilitates transportation of the vehicle.

Spring loaded detent systems are used in external rear vision mirrors on motor vehicles to provide the ability for the mirror head to be alternatively held in a deployed position and a parked or folded position.

A problem in the assembly of such spring loaded detent systems is that while a moving part (typically connected to the mirror head) and a fixed part (typically connected to the mirror base or bracket) are being assembled, a spring which loads the detent system must be held compressed. Such an operation usually requires special tooling to hold the spring in a loaded position during assembly. Furthermore, such an assembly operation can, in some cases, pose a danger to the assembler.

In order to limit the degree of rotation of the head with respect to the base, end stops are provided within the mirror assembly. A known simple end stop arrangement includes a projection fixed with respect to either the head or the base that engages a stop fixed with respect to either the base or the head. Such simple stop arrangements have the disadvantage that they cause twisting of the head with respect to the base. This twisting causes a shear load through the pivot axis.

Other end stop arrangements have the disadvantage that they limit the degree of travel of the head with respect to the base to less than 180°.

It is an object of the invention to provide a vehicle external mirror assembly that overcomes at least some of the above stated problems.

It is a further object of the invention to provide an improved pivot assembly for a vehicle external mirror that is adapted to pre-load a detent spring in a simple assembly operation not requiring any special tools or expertise.

It is a further object of the invention to provide a method for assembling a pivot assembly incorporating a spring-loaded detent system.

SUMMARY OF THE INVENTION

According to a first aspect of the invention, there is provided a pivot assembly for a vehicle external mirror having a mirror base mounted to a mirror head, the assembly comprising:
 a first member having a first detent side, a first inner side and a first aperture extending from the first detent side to the first inner side;
 a second member having second detent side, a second inner side and a second aperture extending from the second detent side to the second inner side, the second member positioned with respect to the first member such that the second detent side is facing the first detent side and the first and second apertures are aligned, the first and second members mountable in, or part of, either the base and the head respectively or the mirror head and the mirror base respectively;
 a detent means between the first detent side and the second detent side, the detent means operable to hold the mirror head in a deployed position with respect to the mirror base;
 a spigot having a shaft and a head depending from the shaft, the shaft passing through the first and second apertures thereby providing a pivot axis about which the second member can rotate with respect to the first member;
 a spring adapted and positioned around the spigot to bias the first and second sides towards each other and therefore to hold the detent means engaged, thereby restraining movement of the mirror head with respect the mirror base; and
 a means for applying a pre-load to the spring,
 whereby initial relative rotation between the second member and the first member in a first direction causes loading of the spring and whereby the load is retained as a pre-load during subsequent relative rotations between the second member and the first member.

Preferably the means for applying a pre-load a means for locking the spigot against rotation with respect to the first member before the spring is pre-loaded;
 an arm projecting radially from the head of the spigot;
 a spigot guide on or adjacent the second inner side, the spigot guide comprising a ramped surface adapted to receive the radially projecting arm so as to cause the spigot head to move axially away from the first member before the spring is fully pre-loaded as the second member rotates in the first direction with respect to the spigot and the first member; and
 a means for locking the spigot against rotation with respect to second member after the spring is pre-loaded.

According to a first form of the first aspect of the invention, there is provided a pivot assembly as claimed in claim 2 wherein the means for locking the spigot against rotation with respect to the second member comprises:
 a seat within the spigot guide arranged and positioned to lockably receive the arm projecting from the spigot at the end of the initial rotation.

According to a second form of the first aspect of the invention, there is provided a pivot assembly as claimed in claim 2 wherein the means for locking the spigot against rotation with respect to the second member comprises:
 a locking member located adjacent the spigot guide on the opposite side to the first member and biased in a direction substantially parallel to the spigot shaft's longitudinal axis and towards the guide, the locking member defining an aperture for receiving the radially projecting arm, the aperture and radial arm mutually shaped to prevent relative rotation.

According to a third form of the first aspect of the invention, there is provided a pivot assembly as claimed in claim 2 wherein the means for locking the spigot against rotation with respect to the second member comprises:
 a locking arm biased radially inwards towards the spigot head for engagement with the radially projecting arm, the locking arm and radial arm mutually shaped to prevent relative rotation once the radial arm has reached a pre-determined angular position with respect to the spigot guide.

Preferably each of the first, second and third forms of the invention further comprise A pivot assembly as claimed in claim 5 further comprising a third member positioned adjacent the inner side of the first member and fixed to the first member, the third member and the spigot mutually shaped so as to prevent relative rotation in one direction during said initial rotation.

According to a second aspect of the invention, there is provided a method of self loading a spring assembly in a pivot assembly having a detent arrangement with the spring assembly acting to load the detent arrangement, the pivot assembly including a first member, a second member and a spigot having a first projection, the spigot received in aligned apertures in respective first and second members, whereby the first member can rotate about the spigot with respect to the second member, the method comprising the steps of:

(a) inserting the spigot into the aperture in the first member with the spring assembly retained between a base on the spigot, the spigot and the first member in an unloaded state;

(b) inserting the spigot into the aperture in the second member;

(c) engaging the first projection with a ramped surface on the second member; and (d) rotating the spigot with respect to the second member whereby the first projection moves along the ramped surface thereby drawing the spigot towards the second member and thereby loading the spring assembly.

Preferably the method of self loading a spring assembly as in claim 13 further comprising the step of locking the spigot against rotation with respect to the first member before the spring is loaded in step (d).

Preferably the method of self loading a spring assembly as in claim 14 further comprising the step of locking the spigot against rotation with respect to the second member after the spring is loaded in step (d).

According to a third aspect of the invention, there is provided a vehicle external mirror assembly comprising:
  a base member mountable in, or part of, a mirror bracket;
  a head member mountable in, or part of, a mirror head;
  a spigot having a shaft, the shaft extending between the base and the head members and providing a pivot axis about which the head member can rotate with respect to the base;
  first and second base-depending inner end stop faces, circumferentially spaced apart;
  first and second head-depending inner end stop faces, circumferentially spaced apart and positioned to alternatively abut corresponding first and then second base-depending inner end stop faces when the head is rotated to a first end position and then to a second end position;
  first and second base-depending outer end stop faces, circumferentially spaced apart; and
  first and second head-depending outer end stop faces, circumferentially spaced apart and positioned to alternatively abut corresponding first and then second base-depending outer end stop faces when the head is rotated to a first end position and then to a second end position,
  wherein all of the four inner end stop faces are radially positioned inwards with respect to all of the four the outer end stop faces such that the inner end stop faces cannot abut the outer end stop faces and wherein the end stop faces are circumferentially positioned such that abutment of the inner end stop faces and abutment of the outer end stop faces at both the first and then the second end positions occurs simultaneously at positions substantially diametrically opposite positions, thereby in use providing a substantially balanced end stop action.

Preferably the mirror assembly further comprises: a base-depending inner end stop member extending in an arc around the pivot axis, the ends of which form the first and second base-depending inner end stop faces; and
  a corresponding head-depending inner end stop member extending in an arc around the pivot axis, the ends of which form the first and second head-depending inner end stop faces.

Preferably the mirror assembly further comprises:
  a base-depending outer end stop member extending in an arc around the pivot axis radially outwards of the base-depending inner end stop member, the ends of which form the first and second base-depending outer end stop faces; and
  a corresponding head-depending outer end stop member extending in an arc around the pivot axis radially outwards of the base-depending outer end stop member, the ends of which form the first and second head-depending outer end stop faces.

According to a fourth aspect of the invention, there is provided a vehicle external mirror assembly comprising:
  a base member mountable in, or part of, a mirror bracket;
  a head member mountable in, or part of, a mirror head;
  a spigot having a shaft, the shaft extending between the base and the head members and providing a pivot axis about which the head member can rotate with respect to the base;
  a detent means between the first detent side and the second detent side, the detent means operable to hold the mirror head in a deployed position with respect to the mirror base;
  a spring adapted and positioned around the spigot to bias base member and head members towards each other and therefore to hold the detent means engaged, thereby restraining movement of the mirror head with respect the mirror base;
  first and second base-depending inner end stop faces, circumferentially spaced apart;
  first and second head-depending inner end stop faces, circumferentially spaced apart and positioned to alternatively abut corresponding first and then second base-depending inner end stop faces when the head is rotated to a first end position and then to a second end position;
  first and second base-depending outer end stop faces, circumferentially spaced apart; and
  first and second head-depending outer end stop faces, circumferentially spaced apart and positioned to alternatively abut corresponding first and then second base-depending outer end stop faces when the head is rotated to a first end position and then to a second end position,
  wherein all of the four inner end stop faces are radially positioned inwards with respect to all of the four the outer end stop faces such that the inner end stop faces cannot abut the outer end stop faces and wherein the end stop faces are circumferentially positioned such that abutment of the inner end stop faces and abutment of the outer end stop faces at both the first and then the second end positions occurs simultaneously at positions substantially diametrically opposite positions, thereby in use providing a substantially balanced end stop action,
  whereby initial relative rotation between the head member and the base member in a first direction causes loading of the spring and whereby the load is retained as a pre-load during subsequent relative rotations between the head member and the base member.

Specific embodiments of the invention will now be described in some further detail with reference to and as illustrated in the accompanying figures. These embodiments are illustrative, and are not meant to be restrictive of the scope of the invention.

DETAILED DESCRIPTION OF PREFERRED EMBODIMENTS OF THE INVENTION

Preferred embodiments of the invention are illustrated in the accompanying representations in which.

Figure 2:
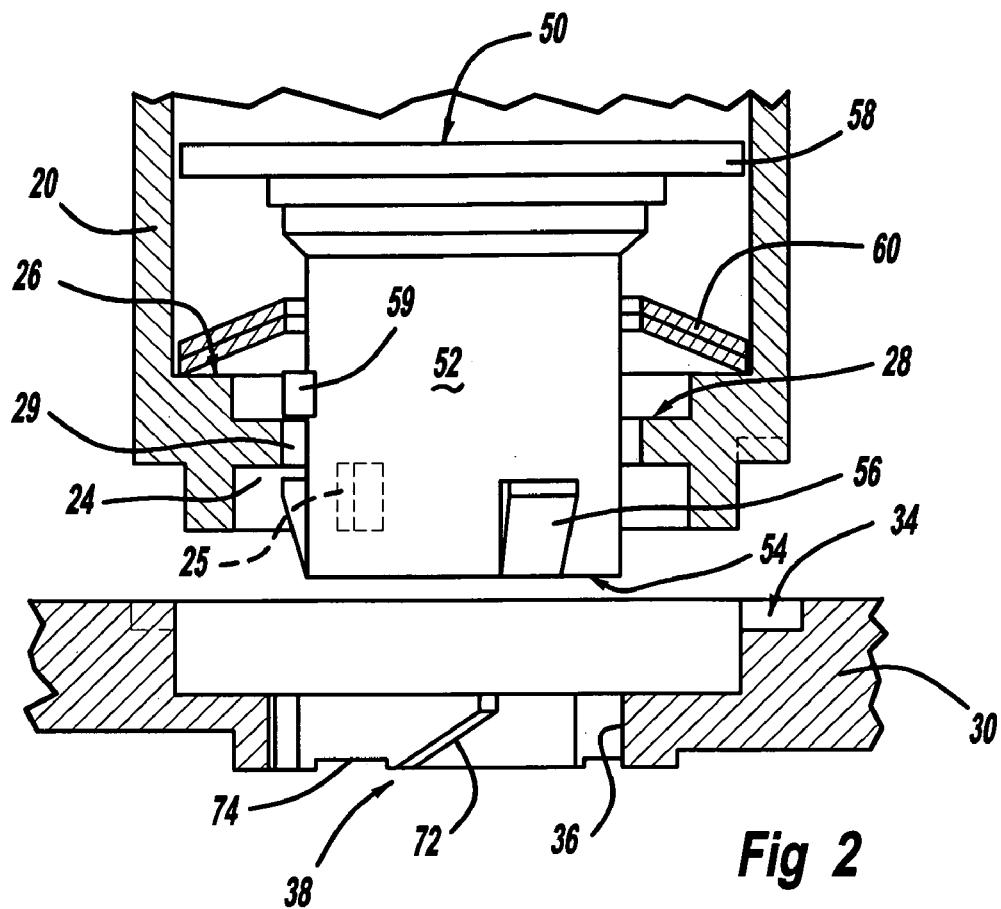
FIG. 2 shows a diagrammatic sectional view of a portion of a pivot assembly for a vehicle external mirror according to a first aspect of the invention, the pivot assembly partially assembled.
Figure 6A:
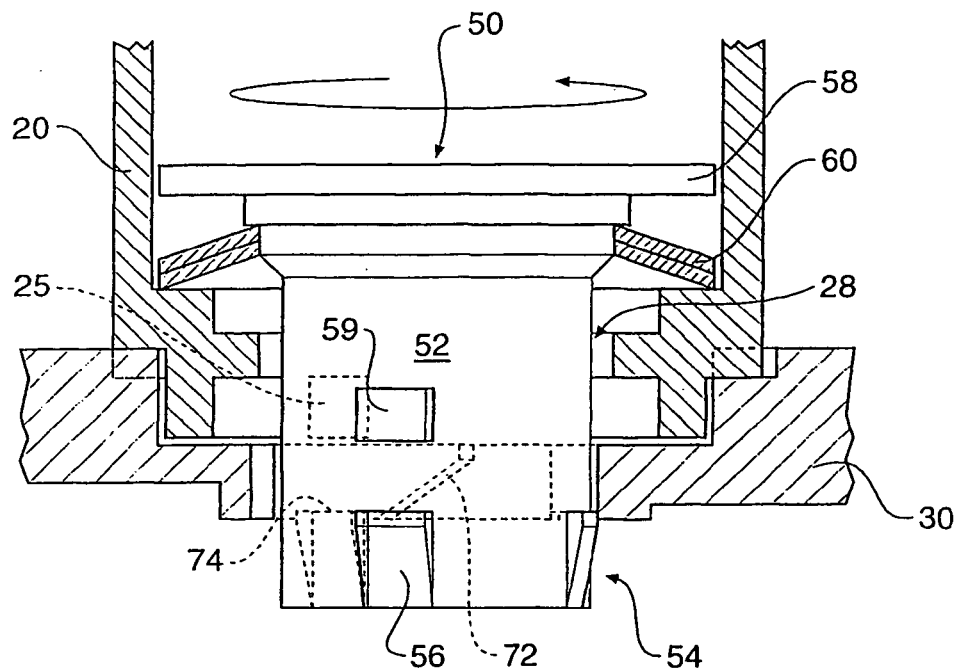
Figure 6B:
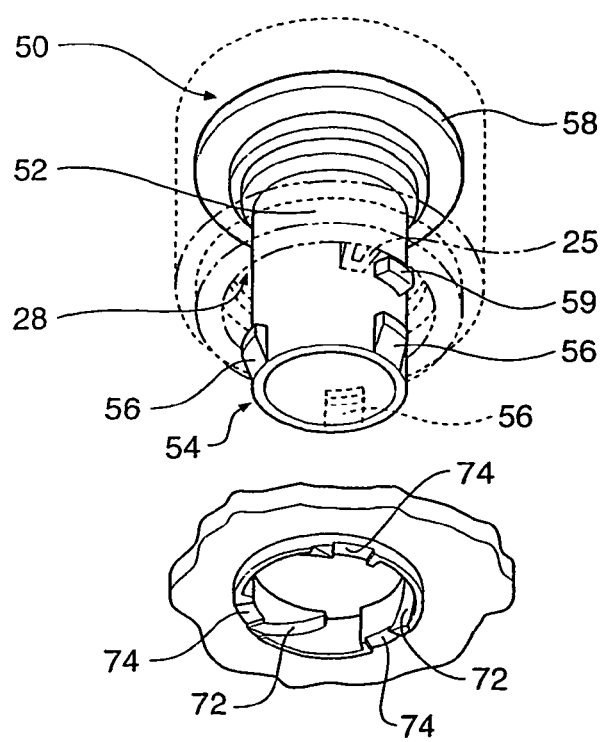

FIGS. 3, 4, 5, and 6a show the assembly of FIG. 2 with a mirror head frame progressively being mounted to a mirror base or bracket;

FIG. 6b shows an exploded perspective view of part of the assembly shown in FIG. 6a.

Figure 7:
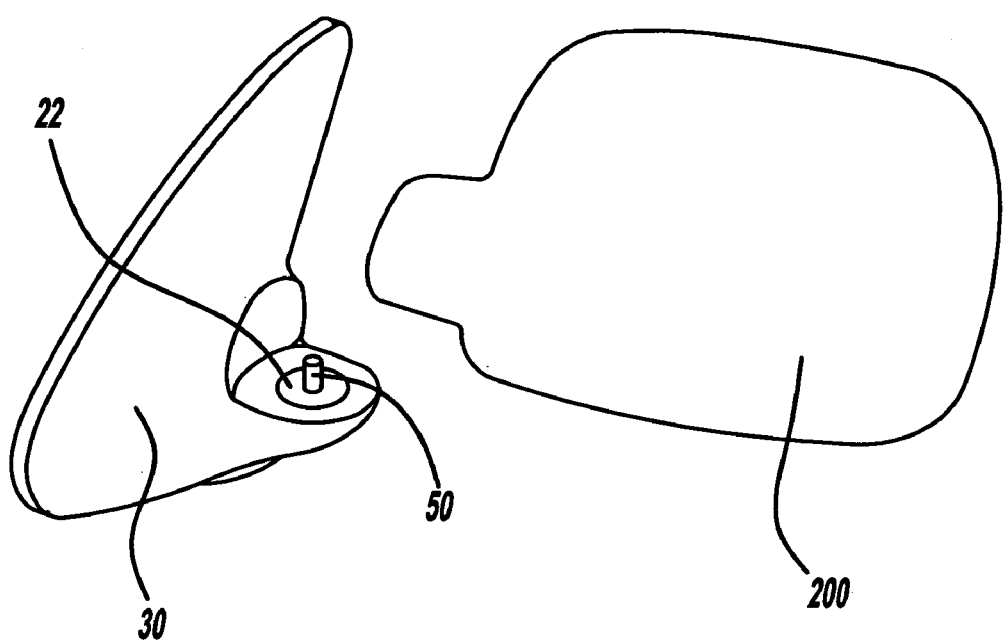

FIG. 7 shows a perspective view of vehicle external mirror having a pivot assembly according to a second aspect of the invention.

Figure 9A:
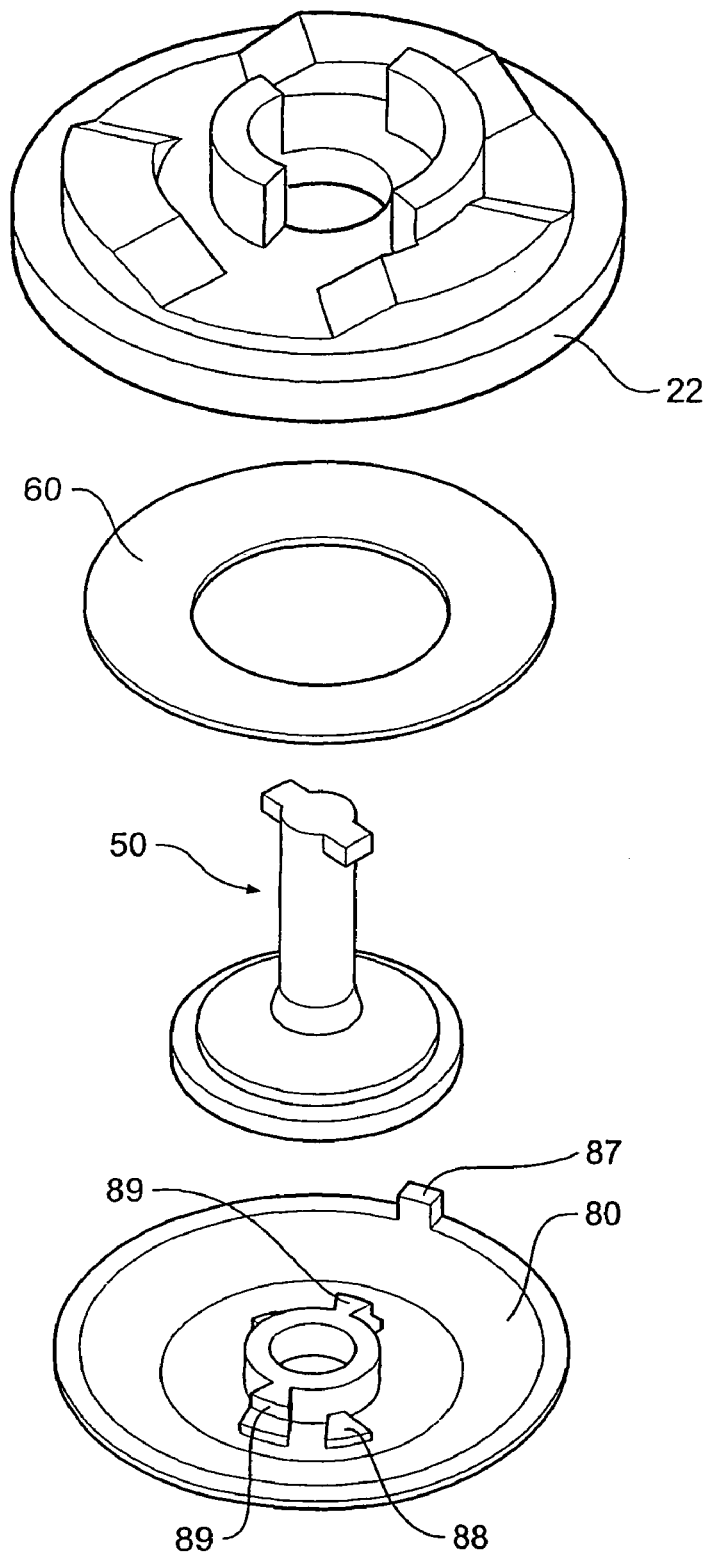
Figure 9B:
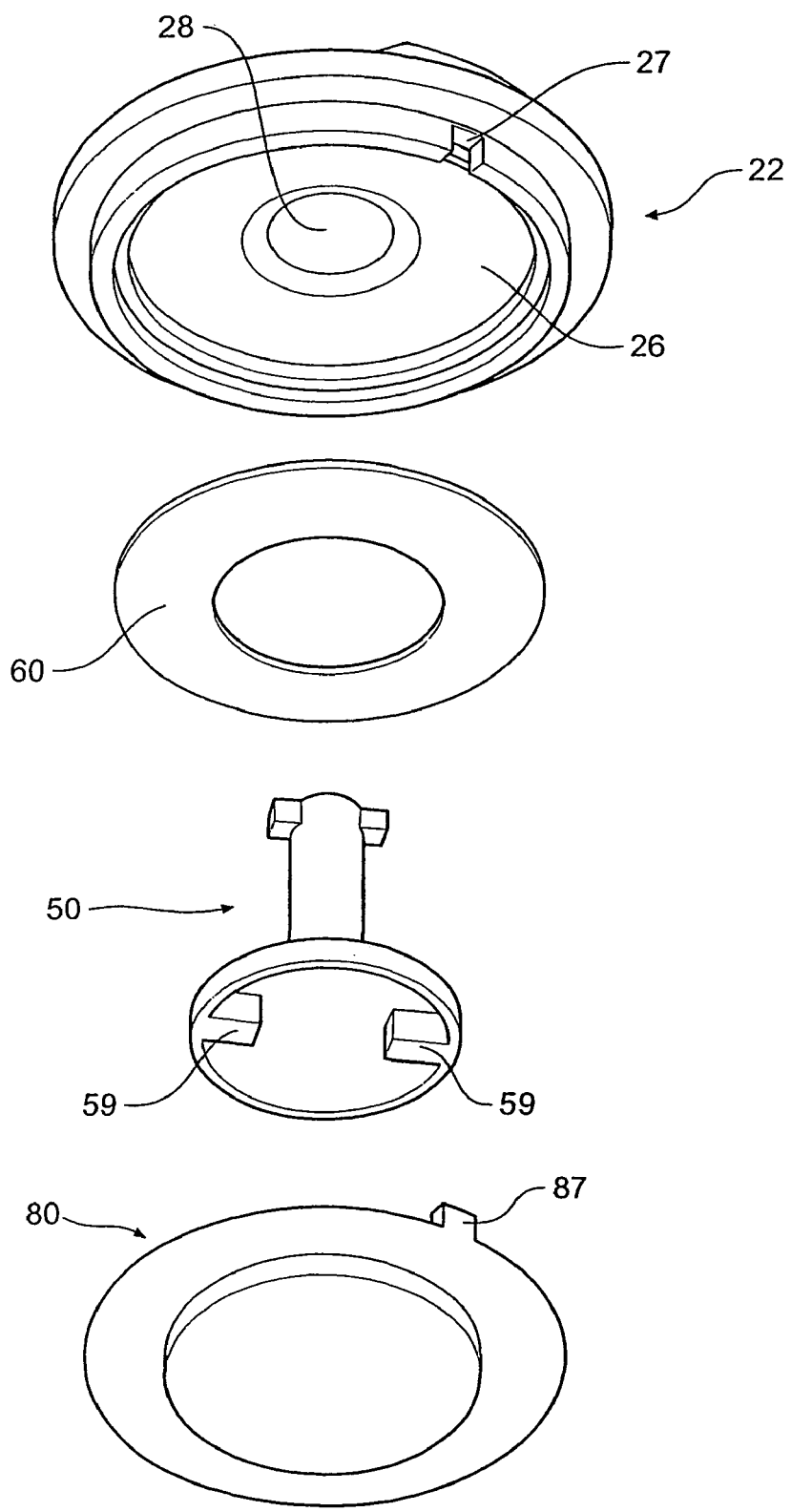
Figure 10A:
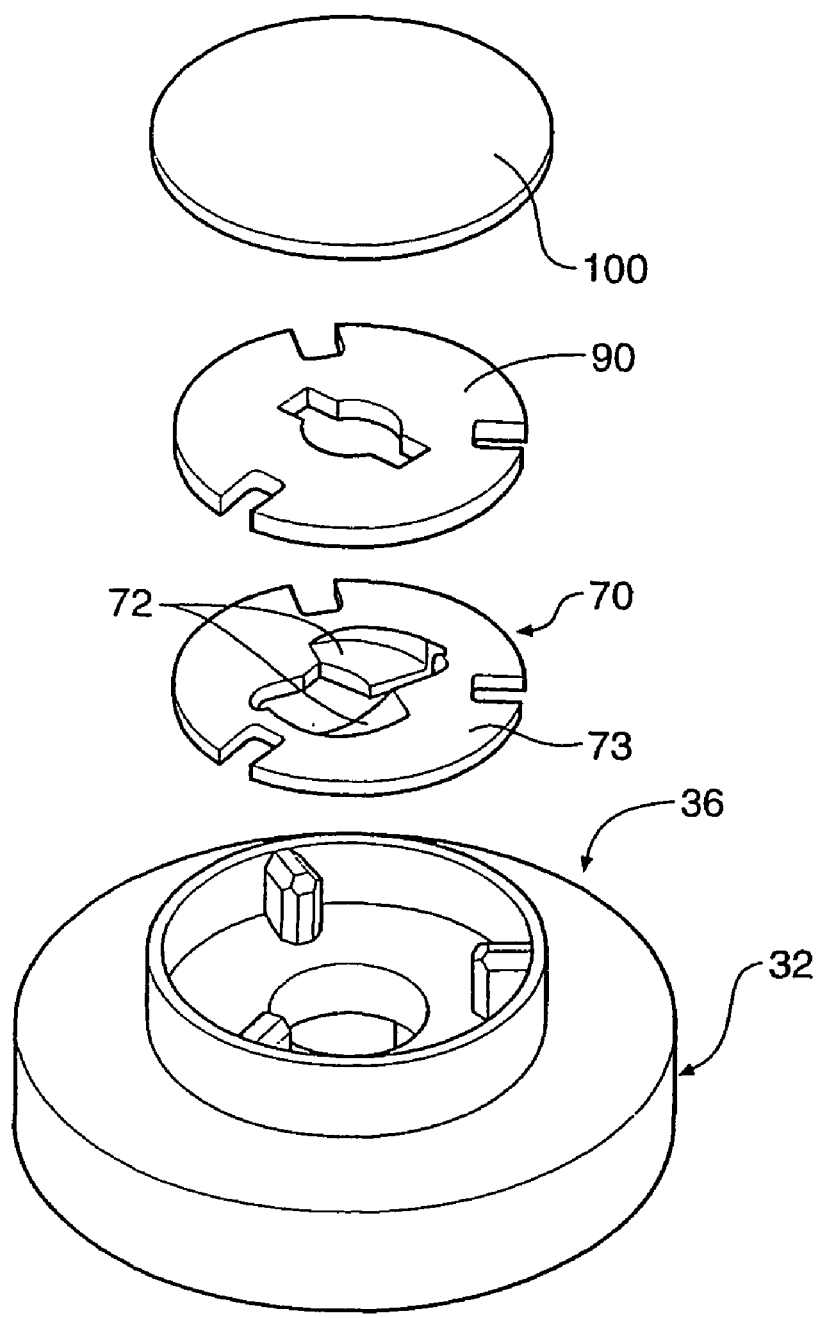
Figure 10B:
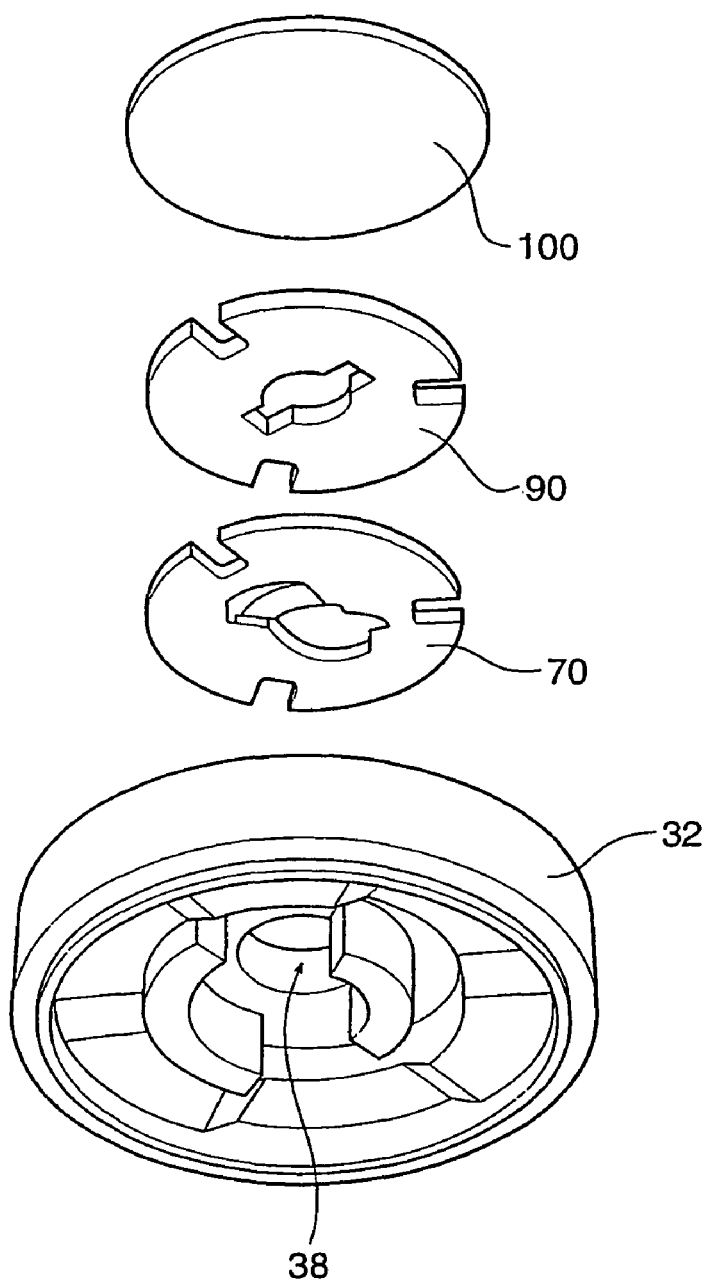
Figure 12:
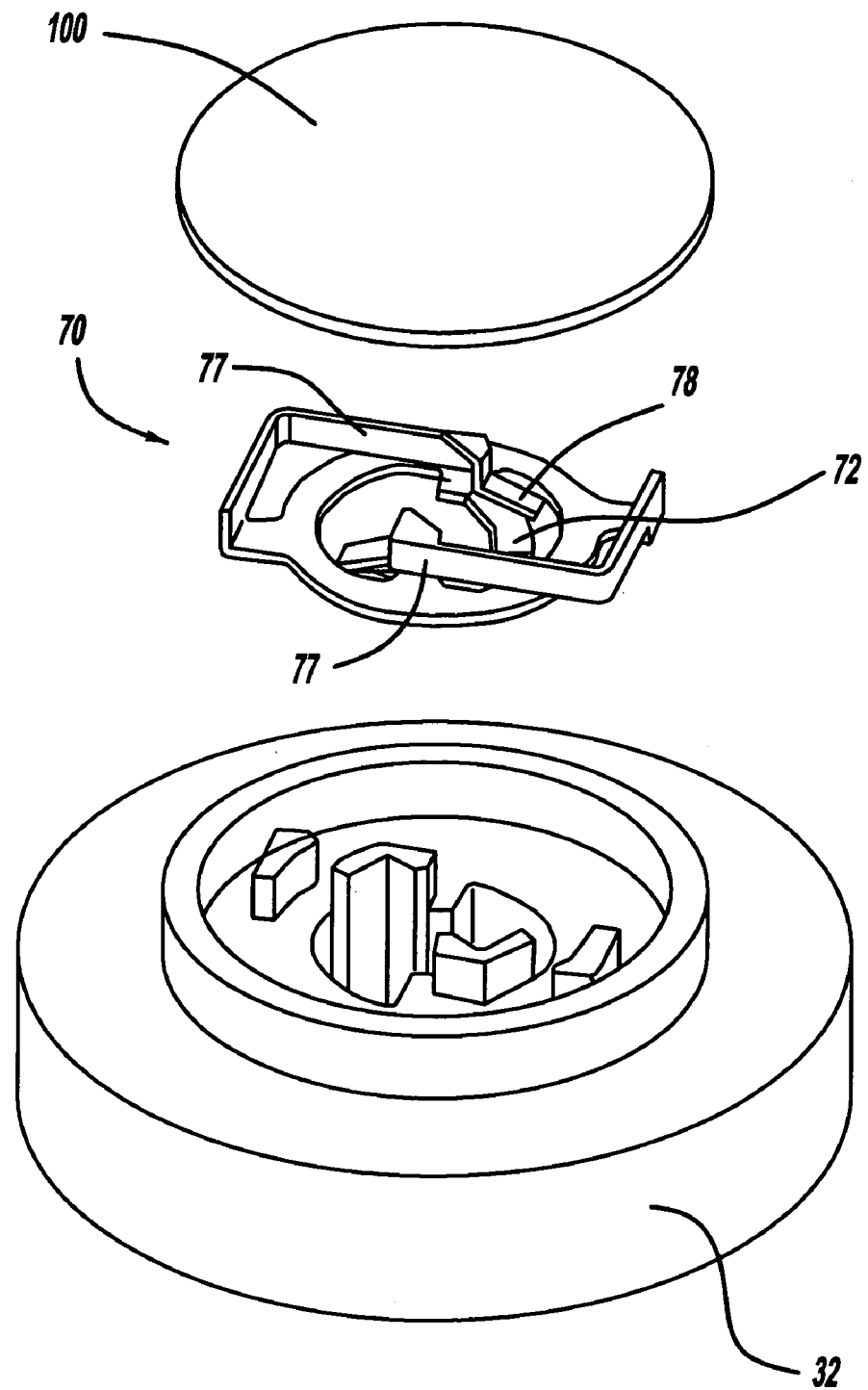
Figure 13:
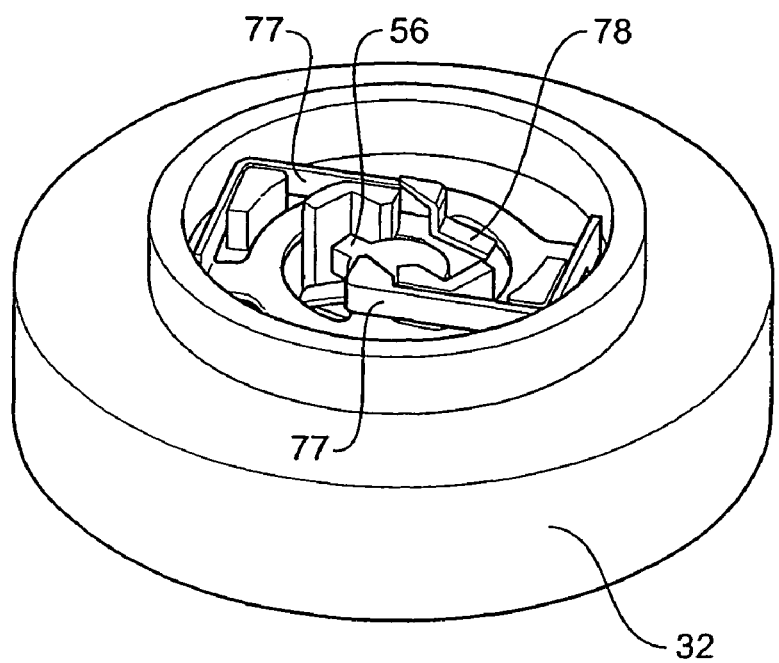
Figure 14:
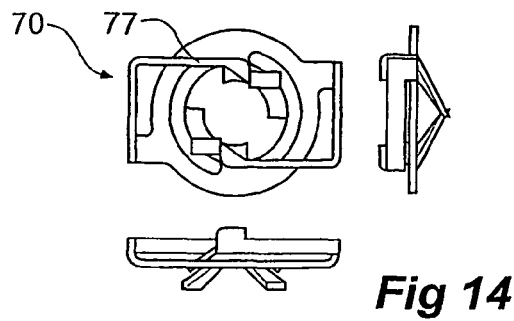

FIG. 8a shows an "exploded" view of a pivot assembly for a vehicle external mirror according to a second aspect of the invention;

FIG. 8b shows the spigot component of the pivot assembly of FIG. 8a;

FIGS. 9a and 9b are more detailed "exploded" views of the lower half of the pivot assembly shown in FIG. 8a;

FIGS. 10a and 10b are more detailed "exploded" views of the upper half of the pivot assembly shown in FIG. 8a;

FIG. 11a is a diagrammatic sectional view of the pivot assembly shown in FIG. 8a;

FIG. 11b is a partial diagrammatic sectional view of the pivot assembly shown in FIG. 11a showing the spigot in an initial condition;

FIG. 11c is a plan view of FIG. 11b;

FIGS. 11d and 11e correspond to FIGS. 11b and 11c respectively but show the spigot in a partially loaded condition;

FIGS. 11f and 11g also correspond to FIGS. 11a and 11b but show the spigot in a final locked condition;

FIG. 12 is an exploded view of the upper half of the pivot assembly according to a third aspect of the invention;

FIG. 13 is a perspective view showing two of the components of FIG. 12 in a assembled condition;

FIG. 14 shows three views of the spigot guide 70 shown in FIG. 12;

FIGS. 15a, 15b, 15c and 15d show plan views of the upper half of the pivot assembly according to the third aspect of the invention in progressive positions from an initial position to a final locked position respectively.

FIRST EMBODIMENT

A first embodiment according the invention is shown in FIGS. 1, 2, 3, 4, 5 and 6a & 6b.

Figure 1:
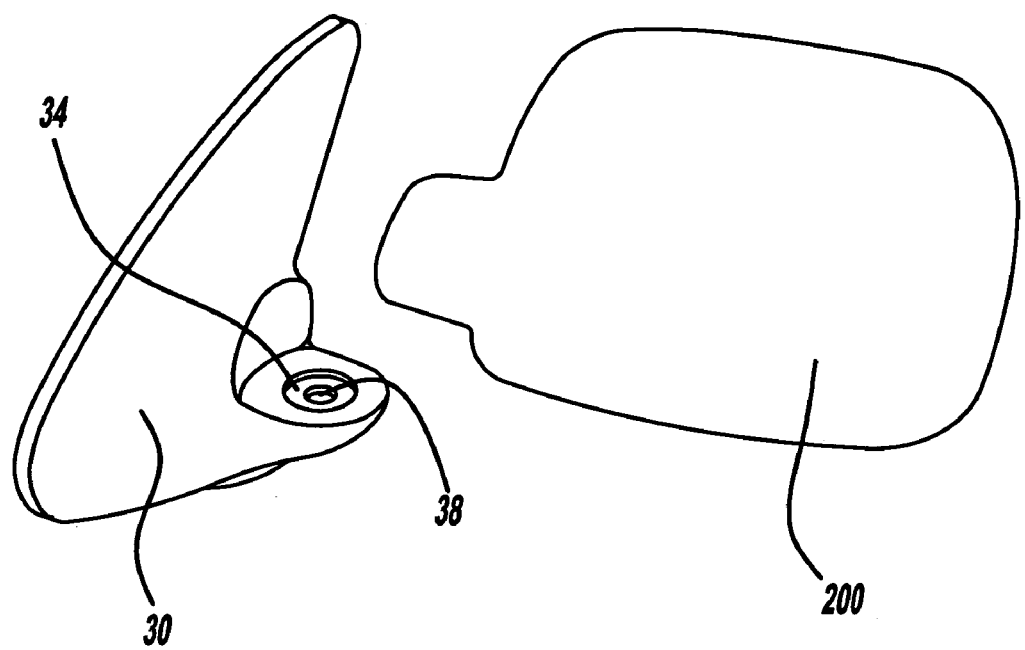
FIG. 1 shows a perspective view of vehicle external mirror having a pivot assembly according to a first aspect of the invention.

FIG. 1 shows in perspective view a mirror head 200 that has a head or case frame mounted within it (not shown). The Mirror base or bracket 30 has a detent side 34 and an aperture 38 extending through the detent side 34, the aperture 38 sized a position to receive a spigot projecting down from the mirror head 200. The spigot 50 is shown most clearly in FIG. 6b.

FIG. 2, shows a first member, in the form of a mirror head frame 20 having a first detent side 24 and a first inner side 26 with an aperture 28 extending between them. A spigot 50, having a shaft 52 and a head 54 depending from the shaft 52 extends through the first aperture 28 thereby providing a pivot axis about which a second member, that is mounted in a mirror head, can be rotatably mounted. A spring 60 is positioned around the spigot shaft 52. The spigot 50 has a base 58 that retains the spring 60. With this embodiment spring 60 is a pair of disc springs (or Belleville Washers), however in some applications a coil spring may be appropriate. The degree of spring deflection from FIG. 2 through to FIG. 5 has been exaggerated to assist in explaining this embodiment of the invention.

Spigot 50 is provided with a spigot base projection 59 and three spigot head projections 56 as shown in FIGS. 1 and 2. Cut-outs 29 within mirror head 20 allow spigot base projections 59 to pass through aperture 29 as is progressively shown from FIGS. 2 to 3.

Figure 3:
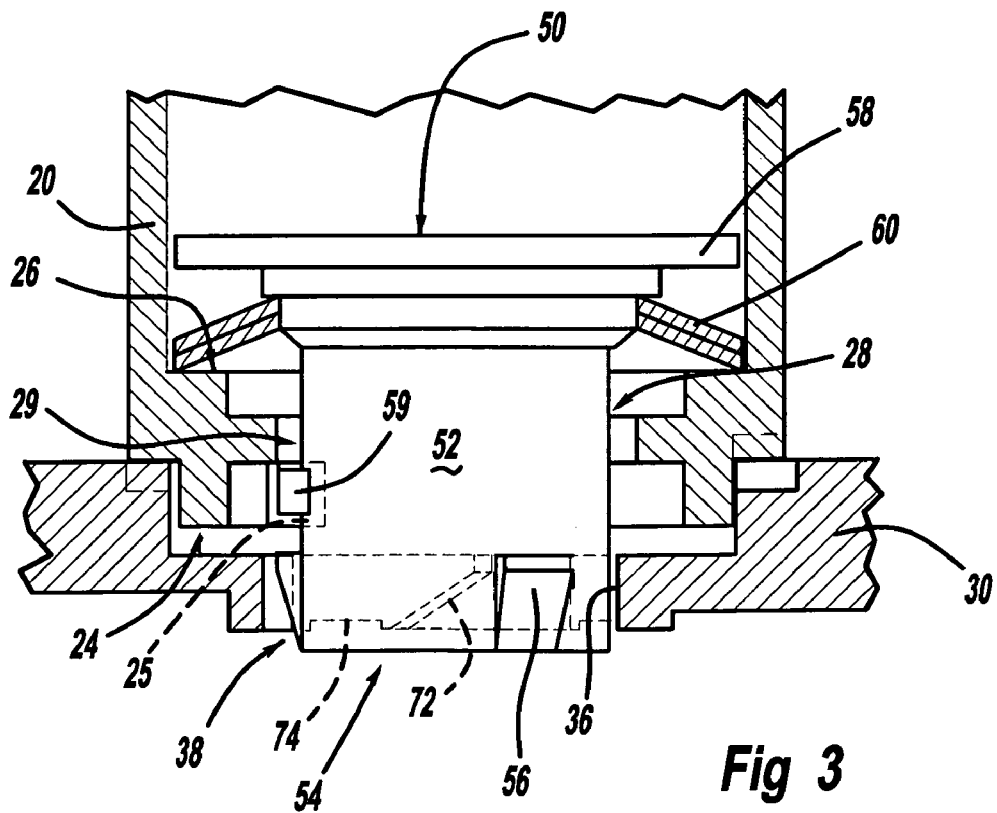

Referring now to FIG. 3, a second member in the form of a mirror base or bracket 30 is partially shown. Mirror base 30 has a detent side 34 and an inner side 36. A second aperture 38 extends from the second detent side 34 to the second inner side 36. This aperture 38 surrounds the shaft 52 of spigot 50 as shown in FIG. 3.

A detent means is provided between the first detent side 24 and the second internal side 34. The detent means is operable to hold the mirror head 30 in a deployed position with respect to the mirror head 20.

A means for applying a pre-load to the spring 60 is provided whereby initial relative rotation between the mirror head 20 and the mirror base 30 causes pre-loading of the spring 60 and whereby the pre-load is retained during subsequent relative rotations between the head 20 and the base 30.

The means for applying a pre-load to the spring 60 includes:

1. A means for locking the spigot 50 against rotation with respect to the head 20 before the spring is pre-loaded;
2. A pair of projections 56 in the form of arms projecting radially from the head 54 of the spigot 50;
3. A spigot guide on the second external side 36, the guide including a ramped surfaces 72 (shown in FIG. 4) adapted to receive the radially projecting arms 56 so as to cause the spigot head 54 to move axially away from the base before the spring is fully pre-loaded as the head rotates with respect to the spigot 50 and the base;
4. A means for locking the spigot 50 against rotation with respect to the head after the spring 60 is pre-loaded.

Spigot 50 described above has three projections 56 in the form of arms projecting radially from the spigot shaft 52. Two projections could be used, but three provides greater stability and four or five would increase the strength of the assembly.

Figure 4:
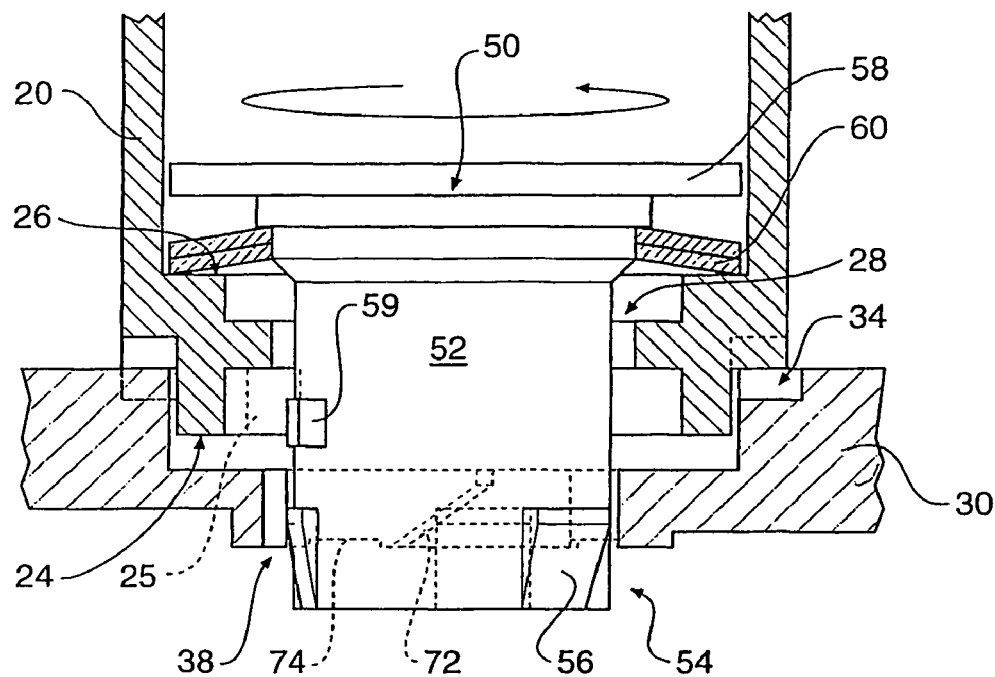

The means for locking the spigot 50 against rotation with respect to the head 200 before the spring 50 is pre-loaded is provided by the spigot base projection 59 in conjunction with the stop 25 provided on the mirror head 20 as shown in FIGS. 3 & 4. Stop 25 is more clearly shown in perspective view in FIG. 6b.

The projection 59 and the base member 30 including its stop 25 are mutually shaped as to prevent relative rotation in one direction during pre-loading. Again, this is most clearly shown in the perspective view of FIG. 6b.

Figure 5:
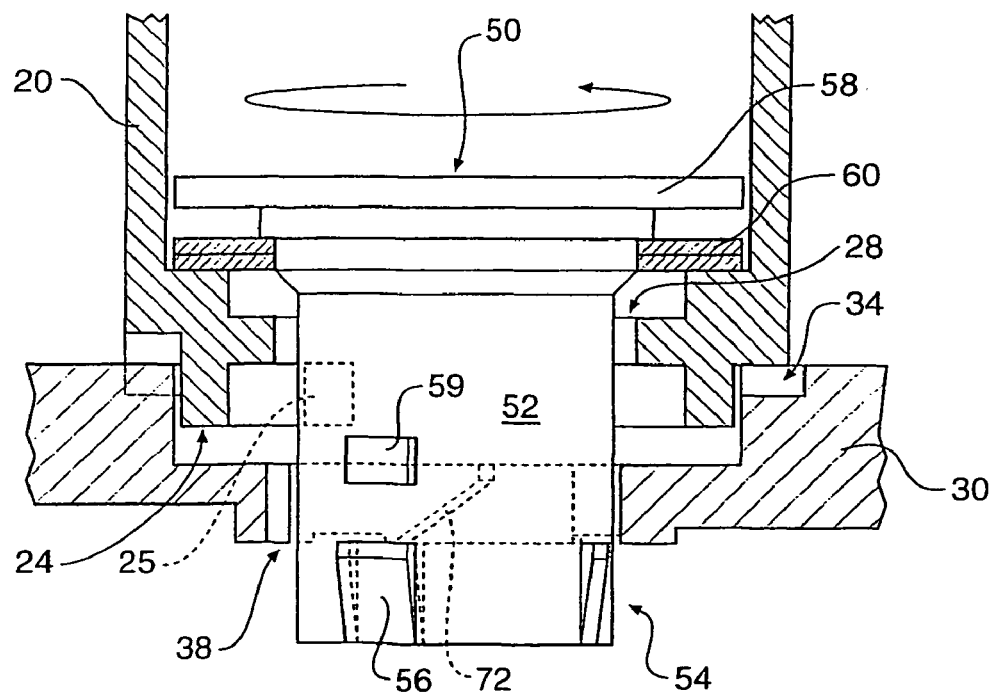

The means for locking the spigot 50 against rotation with respect to the mirror base 30 after the spring 60 is pre-loaded is provided by seats 74 which are positioned to lockably receive the arm 56 projecting from the spigot head 54 as shown in FIG. 5.

FIG. 5 shows the pivot assembly with the mirror head 20 rotated to its most forward breakaway position with respect to the mirror base 30. In this position, the arms 56 have ridden up ramped surfaces 72 thereby pre-loading spring 60 before dropping it into seats 56.

FIG. 6 shows the mirror head 20 rotated back through to its deployed position. Arms 56 remain within seats 74 locking the spigot 50 with respect to the mirror head 20.

Figure 16:
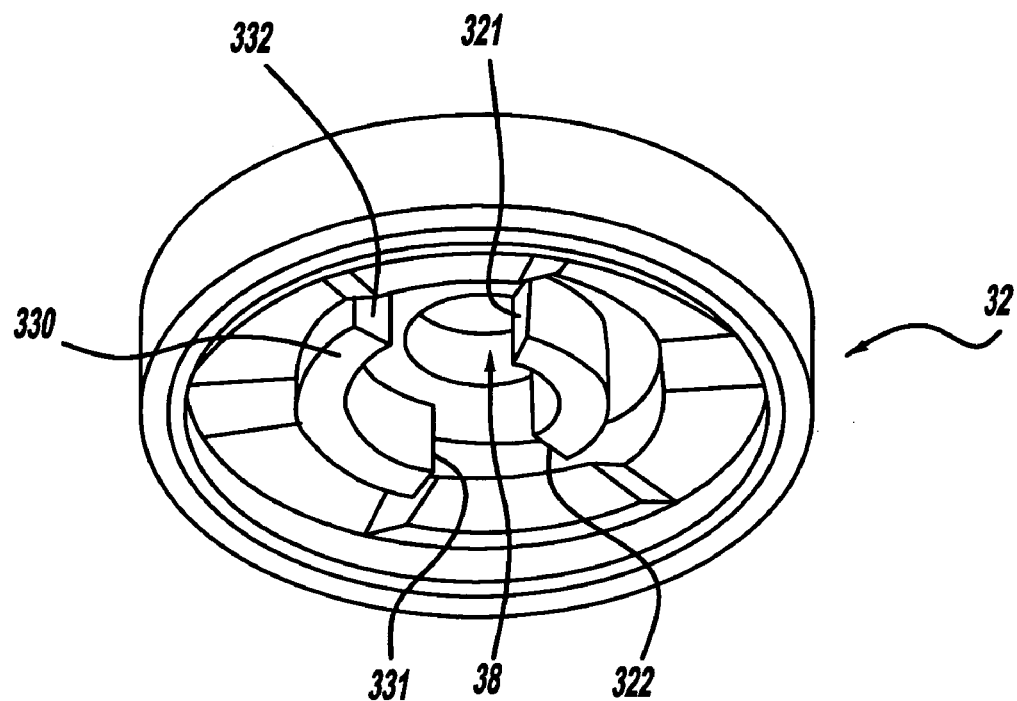
Figure 17:
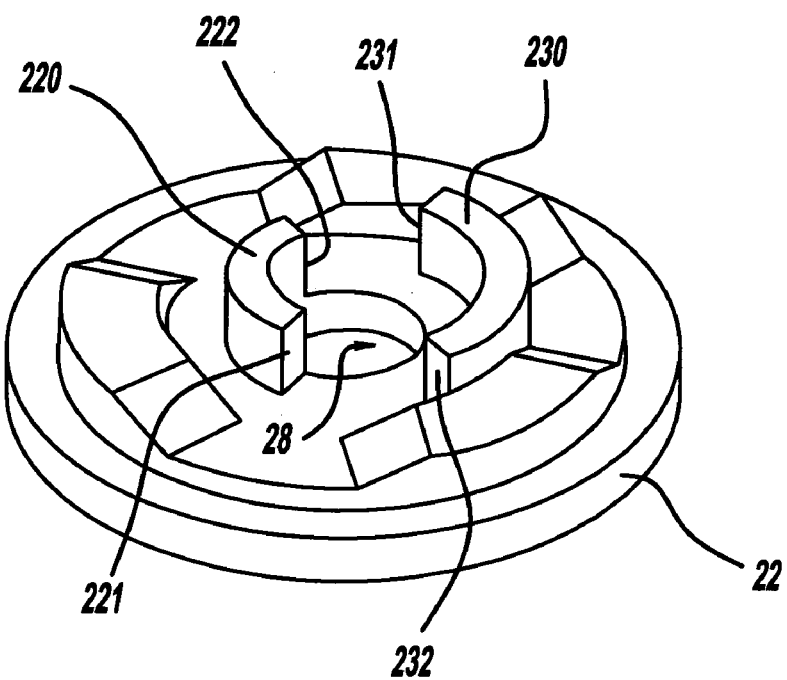
Figure 18:
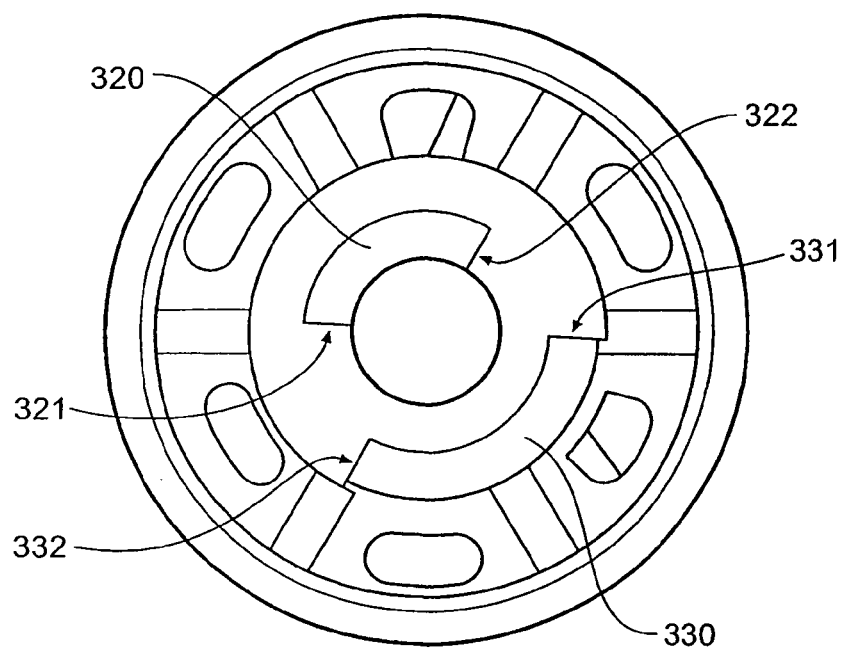
Figure 19:
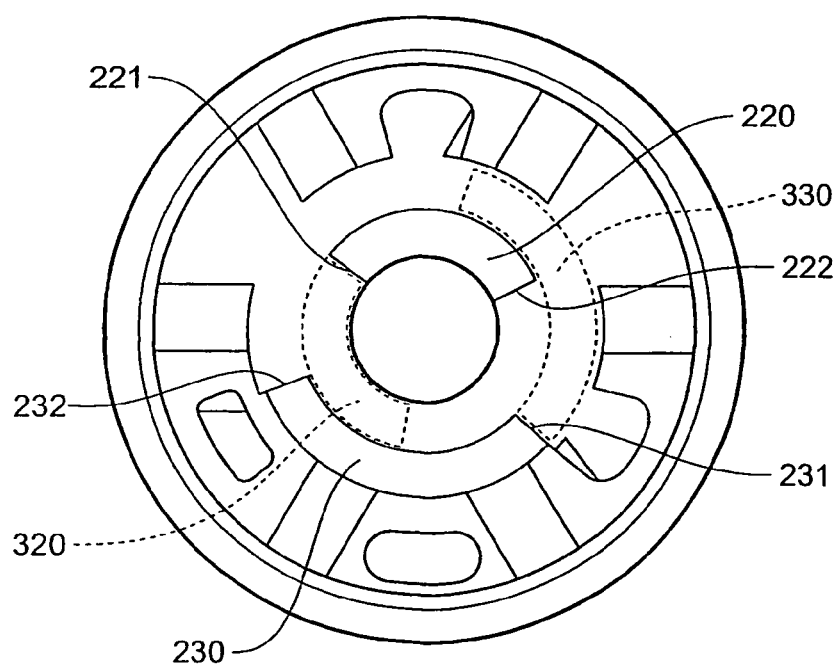

FIG. 16 is a perspective view of a head member of the pivot assembly of the present invention;

FIG. 17 is a perspective view of a base member of the pivot assembly of the present invention;

FIG. 18 is a plan view of a head member of the pivot assembly of the present invention; and FIG. 19 is a plan view of a base member of the pivot assembly of the present invention;

SECOND EMBODIMENT

A second embodiment according to the invention is shown in FIGS. 7, 8, 9*a*, 9*b*, 10*a*, 10*b*, 11*a* to 11*g*. This embodiment of the invention is very similar to the embodiment described above with the primary differences being in the means for locking the spigot against rotation with respect to a first member 22 before the spring is fully pre-loaded and in the means for locking the spigot against rotation with respect to a second member 32 after the spring is pre-loaded.

Referring to FIGS. 7, 8*a*, 8*b*, 9*a* and 9*b*, a first member 22 is shown. This member is mountable either in a mirror base (mirror bracket) or alternatively in a mirror head. An adjacent second member 32, shown in FIG. 8*a*, is also mountable in either a mirror head or a mirror base. For simplicity of description, from here on in, the first member 22 shall be assumed to be mountable to a mirror base and second member 32 shall be assumed to be mountable in a mirror head (the opposite way around to the arrangement of the first embodiment described above).

Referring to FIGS. 7 and 9*a* and 9*b*, a first end cap 80 having a locking lug 87 engageable with a recess 27 within first member 22 (shown best in FIG. 9*b*) is provided for two purposes. The first purpose is to provide a means for locking the spigot 50 against rotation with respect to the first member 22 before the spring 50 is pre-loaded. The second purpose is to provide a means of sealing the external side 26 of the first member 22 from the ingress of foam where the pivot assembly is to be mounted in a foam filled mirror base.

End cap 80 has a pair of opposed spigot base retention stops 89 clearly shown in FIG. 9*a*. Spigot base retention stops 89 are located so that spigot 50 is restrained from rotational movement in one direction with respect to the first end cap 80 and hence the first member 22 during the pre-loading of the disc spring 60.

Smaller spigot base positioning stops 88 are also shown in FIG. 9*a*. These positioning stops hold the spigot 50 in its correct orientation during assembly. Once the disc spring 60 is pre-loaded, the spigot base projections 59 will clear the spigot base positioning stops 88 and therefore the spigot 50 will be free to rotate, to a limited extent, with respect to the cap 80, the first member 22 and therefore the mirror base.

Again referring to FIG. 8*a*, components mountable in a mirror head are shown above the first member 22. These components are: a second member 32, a spigot guide 70, a locking plate 90 and a second end cap 100.

The components mountable in a mirror head are shown in more detail in FIGS. 10*a* and 10*b*. Spigot guide 70 sits on top of the second inner side 36 of the second member 32. A pair of opposed ramped surfaces 72 extend downwards from a top landing 73 on top of the spigot guide 70. The ramped surfaces 72 are adapted to receive the arms 56 that project radially from the head of the spigot 50 so as to cause the spigot head to move axially away from the first member as the second member rotates with respect to the spigot and the first member. Disc spring 60 is compressed between the spigot base 58 and the inner side 26 of the first member 22 during this process.

Locking plate 90 has a locking aperture 92 sized and positioned to receive the radially projecting arms 56 once the spigot 50 has rotated up the ramp 72 and onto the landing 73. Locking plate 90 is biased in a direction parallel to the spigot shaft's longitudinal axis and away from the second end cap 100 towards the spigot guide 70 by a spring or any other suitable means.

The pivot assembly according to the second aspect of the invention is assembled as follows. The spigot 50 is placed onto the first end cap 80 with the spigot base projections 59 aligned between the spigot base positioning stops 88 and the spigot base retention stops 89. Spring 60 is placed over the top of the spigot head 54 and is positioned on top of spigot base 58. Next the spigot shaft 52 is inserted through first aperture 28 within first member 22 as best illustrated in FIG. 9*b*. Locking lug 87 projecting from the first end cap 80 is aligned within recess 27 ensuring the correct orientation of the components.

The upper half of the assembly shown in FIGS. 10*a* and 10*b* is assembled by placing the spigot guide 70 and the locking plate 90 in position over the splines on the top surface of the second member 32. Cap 100 can also be assembled at this time.

The assembled upper and lower assemblies can at this stage be mounted in the mirror head and mirror base respectively.

The upper assembly and the lower assembly (and the mirror head and mirror base) are now brought together so that the spigot head 54 penetrates the second aperture 38 within the second member 32 as shown in FIG. 10*b*. The spigot head projections 56 are now in the position shown in FIGS. 11*b* and 11*c*, ready for engagement with ramped surface 72 of spigot guide 70.

At this time the spigot 50 is locked with respect to the first member 22 by the action of the spigot base retention stops 89 against the spigot base projections 59. This allows the second member 32 to be rotated with respect to the first member 22 so as to pre-load the spring 60 as progressively shown in FIGS. 11*d* and 11*e* and then FIGS. 11*f* and 11*g*. These Figures show that the spigot head projections 56 and hence the spigot 50 itself is lifted with respect to the first member 22 thereby compressing the disc spring 60 by the action of the ramped surface 72 as the second member 32 (and mirror head) is progressively rotated through approximately 120 degrees with respect to the first member 22 (and mirror base). Locking plate 90 is progressively lifted as is shown from FIGS. 11*b* to 11*d* and then drops down to secure the projections 56 as shown in FIG. 11*f*. this then locks the spigot head 54 and hence the entire spigot with respect to the second member 32. By this stage the spigot base 58 has been raised clear of the spigot base positioning stops 89 and therefore the spigot 50 and hence the second member 32 is able to rotate, to a limited extent, with respect to the first member 22.

Lifting of the spigot head 54 upwards by the action of the ramp 72 is described above causes compression and hence pre-loading of the disc spring 60. This pre-load is retained during subsequent relative rotations between the second member 32 (and mirror head) and the first member 22 (and mirror base).

THIRD EMBODIMENT

A third embodiment according to the invention is shown in FIGS. 12, 13, 14, 15, 15b, 15c and 15d. This embodiment of the invention is very similar to the second embodiment of the invention described above with the primary difference being in the means for locking the spigot 50 against rotation with respect to the second member 32 (and mirror head) after the spring 60 is pre-loaded.

Referring to FIG. 12, a spigot guide 70 is shown. This spigot guide 70 has a pair of opposed ramped surfaces 72 identical to those of the second embodiment of the invention. However, this spigot guide 70 differs from the spigot guide 70 of the second embodiment in that it also includes a pair of opposed locking arms 77 terminating in fingers 78 as shown in FIG. 12. The locking arms 77 of this embodiment of the invention perform same function performed by the locking plate 90 of the second embodiment of the invention. That is, the locking arm 77 prevent relative rotation between themselves and the radial arms 56 of the spigot 50 once the radial arms 56 have reached a predetermined angular position with respect to the spigot guide 70. This locked position is shown in FIG. 15d.

Figure 15A:
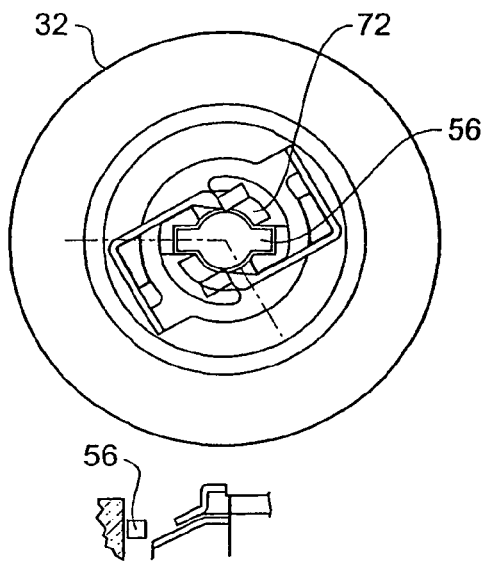
Figure 15B:
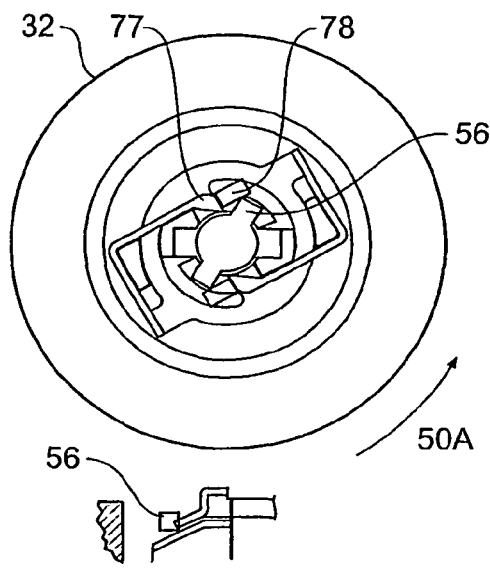
Figure 15C:
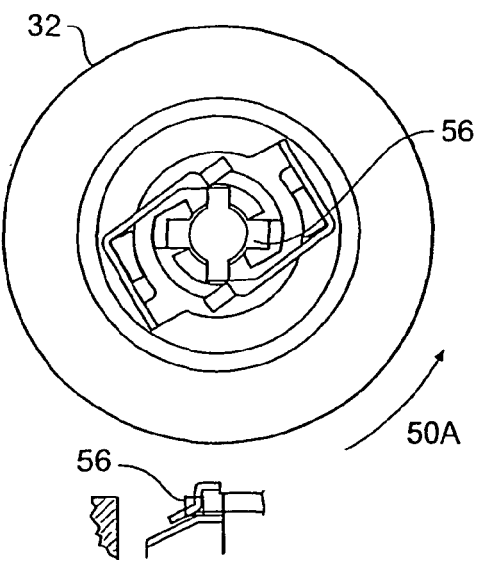
Figure 15D:
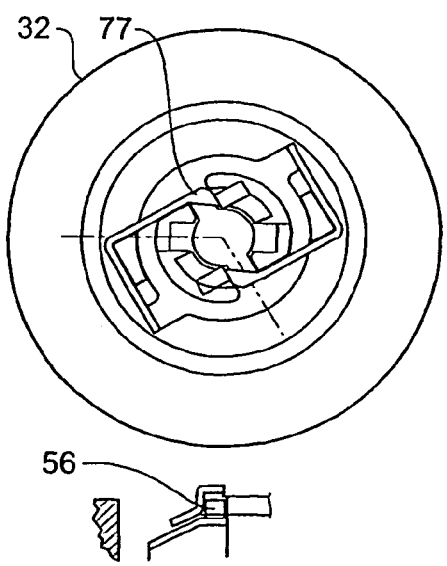

FIGS. 15a, 15b, 15c and 15d show the progressive rotation of the spigot head projections (radial arms) 56 of the spigot 50 with respect to the spigot guide 70 from the initial position at the bottom of the ramped surface 72 shown in FIG. 15a to the top of the ramp and locked position shown in FIG. 15d. FIGS. 15b and 15c show the radial projections 56 engaging the locking arms 77 and displacing them radially outwards as the spigot 50 rotates with respect to the second member 32 as indicated by arrows 50A. In FIG. 15d, it can be seen that the locking arm 77 has sprung back inwards towards the spigot head 54 so as to engage the radially projecting arms 54 thereby locking them in position with respect to the spigot guide 70 and hence the second member 22.

End Stop Feature

Another aspect of the invention is embodied in the second embodiment of the invention shown in FIG. 7 and in FIGS. 8a to 11g.

Referring to FIG. 7, a vehicle external mirror assembly according to the invention having a mirror head 30 pivotally mounted to a mirror base or bracket 20 is shown.

The head 30 pivots with respect to the base 20 about a spigot 50 that protrudes from a base member 22 to extend into the head 30.

Base member 22 is more clearly shown in FIG. 17. The base member 22 has a base-depending inner end stop member 220 which extends in an arc around the pivot axis. The base-depending inner end stop member 220 has a corresponding head-depending inner end stop member 320 depending from the head member 32.

The base member 22 also has a base-depending outer end stop member to 230 which extends in an arc around the pivot axis. The outer end stop member 230 has a corresponding head-depending outer end stop member 330 depending from the head member 32.

The two inner end stop members 220 and 320 are positioned radially inwards from the two outer end stop members 230 (having end stop faces 231, 232, respectively) and 330 (having end stop faces 331, 332, respectively). This allows the designer to create an assembly where the head member 32 (and hence the head 30) can rotate up to and beyond 180 degrees with respect to the base member 22 (and hence the base or bracket 20). This can be achieved while providing two pairs of abutting surfaces for each direction of rotation thereby in use providing a substantially balanced end stop action. This is shown more dearly in FIG. 19.

FIG. 19 shows that base-depending inner end stop member 220 has a first end stop face 221 and a second end stop face 222. Corresponding end stop faces 321 and 322 are provided on the head-depending inner end stop member 320 (also see FIG. 18).

When the head is rotated to a first end position (that is in a first direction) the first base-depending inner end stop face 221 abuts the first head-depending inner end stop face 321. This is illustrated in FIG. 17 in which the head-depending inner end stop member 320 is shown in dotted outline. As is also in this drawing, the first base-depending outer end stop face 231 abuts the first head-depending outer end stop face 331 at the same time thereby providing a substantially balanced end stop action. This eliminates or at least minimises twisting of the head member 32 (and hence head 30) with respect to the base member 22 (and hence base or bracket 20). This in turn reduces shear loads through the pivot axis and hence pivot shaft 52.

FIG. 8a is an exploded perspective view of a complete pivot assembly incorporating the end stop arrangements of the embodiment of the invention shown in FIGS. 16, 17, 18 and 19 and described above. This pivot assembly includes a spigot 50 having a base 58, a spigot guide 70 and a locking plate 90. These components and their functions are described in the applicant's earlier filed patent application PR8300 which is hereby incorporated by reference.

Australian provisional patent application PR3955 titled "Vehicle external mirror wiring integration" discloses a pivot assembly having contacts mounted on detent surfaces for transmission of power from the base to the head. These features and other features disclosed in PR3955 could be used with the present invention and the disclosure of PR3955 is herewith incorporated in its entirety into this specification.

Australian provisional patent application PR3953 titled "Modular pivot using central pivot pin" discloses a pivot mechanism using a solid pivot pin. This features and other features disclosed in PR3953 are/could be used with the present invention and the disclosure of PR3953 is herewith incorporated in its entirety into this specification.

International Application No. PCT/AU00/00413 titled "Method of producing a plastic moulded part including a film covering" discloses a method of forming a moulding component comprising an outer thin film component with an adhered moulded shell. The method of that disclosure could be used to mould hollow form components that may be used with this invention (for instance for the shell of the head and base) and the disclosure of this application is incorporated herewith in its entirety.

Australian provisional patent application PR6683 titled "Foldable vehicle external mirror having auxiliary mirror" discloses a vehicle external mirror having an auxiliary mirror mounted to a distal side of the mirror head. The auxiliary mirror provides rear vision when the mirror head is in its folded position. This features and other features disclosed in PR6683 are/could be used with the present invention and the disclosure of PR6683 is herewith incorporated in its entirety into this specification.

Australian provisional patent application number PR6204 titled "Mirror Heater" discloses an automatic heating control system and apparatus for heating the surface of a mirror to de-ice or de-fog the mirror. The heating process is initiated upon starting the vehicle engine, and is conducted in accordance with a pre-set timing sequence and in accordance with an actual measured temperature of the mirror. These features and other features disclosed in this document could be used with the present invention and the disclosure of PR6204 is hereby incorporated in its entirety into this current specification.

It would also be possible to incorporate other components with the mirror base (mounting bracket) and or mirror head. Such components include electronic sensors such as proximity sensors to determine if the vehicle mirror is close to an obstruction, sensors that sense external temperature and humidity, and sensors incorporated with the car security system such as motion detectors. Other various electronic equipment may be incorporated into the mirror base (mounting bracket) such as lights used to light the area around the vehicle, or lights that may be controlled from within the vehicle that enable the light to be moved so as to provide directional lighting.

Speakers and microphones used to communicate to people external of the vehicle may also be incorporated as well as antennas for various apparatus such as mobile phones, GPS devices and other radio communication devices. In addition, transmitters may be incorporated into the mounting bracket which are used for controlling external objects such as garage doors or providing radio transmissions which may be used, for example, to track or locate the vehicle. Other electronic devices such as automatic toll payment systems or remote transaction systems may be incorporated into the mounting bracket to enable electronic registration of various toll payments.

Cameras may also be incorporated into the mirror base (mounting bracket) which are both forward and rearward looking which are designed to continuously record digital images and to store those images either on command or as a result of an accident or incident. Motion sensors including accelerometers can be used to determine the occurrence of an accident or incident so that images before and after the event are stored.

While the present invention has been described in terms of a preferred embodiment in order to facilitate better understanding of the invention, it should be appreciated that various modifications can be made without departing from the principals of the invention. Therefore, the invention should be understood to include all such modifications within its scope.

What claimed is:

1. A vehicle external mirror comprising:
   a mirror head;
   a mirror base mounted to the mirror head; and
   a pivot assembly operably associated with the mirror head and the mirror base, wherein the pivot assembly comprises:
      a first member having a first detent side, a first inner side and a first aperture extending from the first detent side to the first inner side;
      a second member having a second detent side, a second inner side and a second aperture extending from the second detent side to the second inner side, the second member positioned with respect to the first member such that the second detent side is facing the first detent side and the first and second apertures are aligned, the first and second members mountable in, or part of, either the mirror base and the mirror head respectively or the mirror head and the mirror base respectively;
      a detent arrangement between the first detent side and the second detent side, the detent arrangement operable to hold the mirror head in a deployed position with respect to the mirror base;
      a spigot having a shaft and a head depending from the shaft, the shaft passing through the first and second apertures thereby providing a pivot axis about which the second member can rotate with respect to the first member;
      a spring adapted and positioned around the spigot to bias the first and second inner sides towards each other and therefore to hold the detent arrangement engaged, thereby restraining movement of the mirror head with respect to the mirror base; and
      a structure for applying a pre-load to the spring,
      whereby initial relative rotation between the second member and the first member in a first direction causes loading of the spring and whereby the load is retained as a pre-load during subsequent relative rotations between the second member and the first member;
      wherein the structure for applying a pre-load to the spring comprises:
         a structure for locking the spigot against rotation with respect to the first member before the spring is pre-loaded;
         an arm projecting radially from an exterior surface of the head of the spigot;
         a spigot guide on or adjacent the second inner side, the spigot guide including a ramped surface formed on an interior surface thereof adapted to receive the radially projecting arm so as to cause the spigot head to move axially away from the first member before the spring is fully pre-loaded as the second member rotates in the first direction with respect to the spigot and the first member; and
         an arrangement for locking the spigot against rotation with respect to the second member after the spring is pre-loaded.

2. The vehicle external mirror of claim 1 wherein the arrangement for locking the spigot against rotation with respect to the second member comprises:
   a seat within the spigot guide arranged and positioned to lockably receive the arm projecting from the spigot at the end of the initial rotation.

3. The vehicle external mirror of claim 2 wherein the arrangement for locking the spigot against rotation with respect to the first member comprises:
   a projection extending from the shaft of the spigot, wherein the projection and the first member are mutually shaped so as to prevent relative rotation in one direction during said initial rotation.

4. The vehicle external mirror of claim 3 further comprising a plurality of arms projecting radially from the head of the spigot.

5. The vehicle external mirror of claim 1, wherein the arrangement for locking the spigot against rotation with respect to the second member comprises:

a locking member located adjacent the spigot guide on the opposite side to the first member and biased in a direction substantially parallel to the spigot shaft's longitudinal axis and towards the guide, the locking member defining an aperture for receiving the radially projecting arm, the aperture and radially projecting arm mutually shaped to prevent relative rotation.

6. The vehicle external mirror of claim 5 further comprising a third member positioned adjacent the inner side of the first member and fixed to the first member, the third member and the spigot mutually shaped so as to prevent relative rotation in one direction during said initial rotation.

7. The vehicle external mirror of claim 6 wherein the third member is a cap adapted to seal the inner side of the first member against the ingress of foam.

8. The vehicle external mirror of claim 7 further comprising a plurality of arms projecting radially from the head of the spigot.

9. The vehicle external mirror of claim 1, wherein the arrangement for locking the spigot against rotation with respect to the second member comprises:

a locking arm biased radially inwards towards the spigot head for engagement with the radially projecting arm, the locking arm and radial arm mutually shaped to prevent relative rotation once the radial arm has reached a pre-determined angular position with respect to the spigot guide.

10. The vehicle external mirror of claim 9 further comprising a third member positioned adjacent the inner side of the first member and fixed to the first member, the third member and the spigot mutually shaped so as to prevent relative rotation in one direction during said initial rotation.

11. The vehicle external mirror of claim 10 wherein the third member is a cap adapted to seal the inner side of the first member against the ingress of foam.

12. The vehicle external mirror of claim 11 further comprising a plurality of arms projecting radially from the head of the spigot.

* * * * *